(12) United States Patent
Liao et al.

(10) Patent No.: US 10,191,338 B2
(45) Date of Patent: Jan. 29, 2019

(54) IN-CELL TOUCH DISPLAY APPARATUS

(71) Applicant: HON HAI PRECISION INDUSTRY CO., LTD., New Taipei (TW)

(72) Inventors: Chin-Yueh Liao, New Taipei (TW); Yi-Chun Kao, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/669,025

(22) Filed: Aug. 4, 2017

(65) Prior Publication Data

US 2018/0039145 A1 Feb. 8, 2018

Related U.S. Application Data

(60) Provisional application No. 62/370,727, filed on Aug. 4, 2016.

(51) Int. Cl.

| G06F 3/041 | (2006.01) |
| G06F 3/044 | (2006.01) |
| G02F 1/1333 | (2006.01) |
| G02F 1/1335 | (2006.01) |
| G02F 1/1339 | (2006.01) |
| G02F 1/1362 | (2006.01) |
| G02F 1/1368 | (2006.01) |

(52) U.S. Cl.
CPC ...... *G02F 1/136204* (2013.01); *G02F 1/1339* (2013.01); *G02F 1/1368* (2013.01); *G02F 1/13338* (2013.01); *G02F 1/133514* (2013.01); *G02F 1/133528* (2013.01); *G06F 3/044* (2013.01); *G06F 3/0412* (2013.01); *G02F 2201/503* (2013.01); *G02F 2202/28* (2013.01); *G06F 2203/04103* (2013.01); *G06F 2203/04105* (2013.01); *G06F 2203/04107* (2013.01)

(58) Field of Classification Search
CPC .......... G02F 1/136204; G02F 1/1338; G02F 1/133514
USPC .......................................................... 349/12
See application file for complete search history.

(56) References Cited

U.S. PATENT DOCUMENTS

| 2002/0055269 A1* | 5/2002 | Wurzer ............... H01L 27/0805 438/763 |
| 2011/0169783 A1* | 7/2011 | Wang .................... G06F 3/0412 345/176 |
| 2011/0193010 A1* | 8/2011 | Keite-Telgenbuscher .................. C09J 133/06 252/76 |

(Continued)

FOREIGN PATENT DOCUMENTS

| CN | 104699311 A | 6/2015 |
| CN | 105426006 A | 3/2016 |

*Primary Examiner* — Lucy P Chien
(74) *Attorney, Agent, or Firm* — ScienBiziP, P.C.

(57) ABSTRACT

An in-cell touch display apparatus which is proof against static electricity or the effects of its discharge includes a color filter structure, a thin film transistor (TFT) array structure with a touch electrode layer, and a ground portion. A liquid crystal layer is located between the color filter structure and the TFT array structure, a sealant is located between the color filter structure and the TFT array structure, and a protection layer is included. The protection layer directly contacts the sealant and the protection layer, the sealant, and the ground portion form a discharge path for discharging static electricity from the in-cell touch display apparatus.

6 Claims, 6 Drawing Sheets

(56) References Cited

U.S. PATENT DOCUMENTS

2011/0227851 A1* 9/2011 Oh ...................... G02F 1/13338
345/173
2016/0291767 A1 10/2016 Ding et al.

* cited by examiner

IN-CELL TOUCH DISPLAY APPARATUS

CROSS-REFERENCE TO RELATED APPLICATIONS

This application claims priority to U.S. Provisional Application No. 62/370,727 filed on Aug. 4, 2016, the contents of which are incorporated by reference herein.

FIELD

The subject matter herein generally relates to an in-cell touch display apparatus.

BACKGROUND

Thin film transistor-liquid crystal display (TFT-LCD) has become a mainstream display device. During the manufacturing process of the TFT-LCD, display cells, integrated circuits (IC) that perform driving function, a backlight module, and polarizers and so on, are assembled to form a liquid crystal module (LCM). The accumulation of static electricity, and its release as electrostatic discharge (ESD) is inevitable during assembly of the liquid crystal module. If a large amount of electrostatic charge is left on the display cells and the circuits inside the liquid crystal glass panel, the internal circuits can be damaged. Improvement in the art is preferred.

BRIEF DESCRIPTION OF THE FIGURES

Implementations of the present disclosure will now be described, by way of example only, with reference to the attached figures.

DETAILED DESCRIPTION

Figure 1:
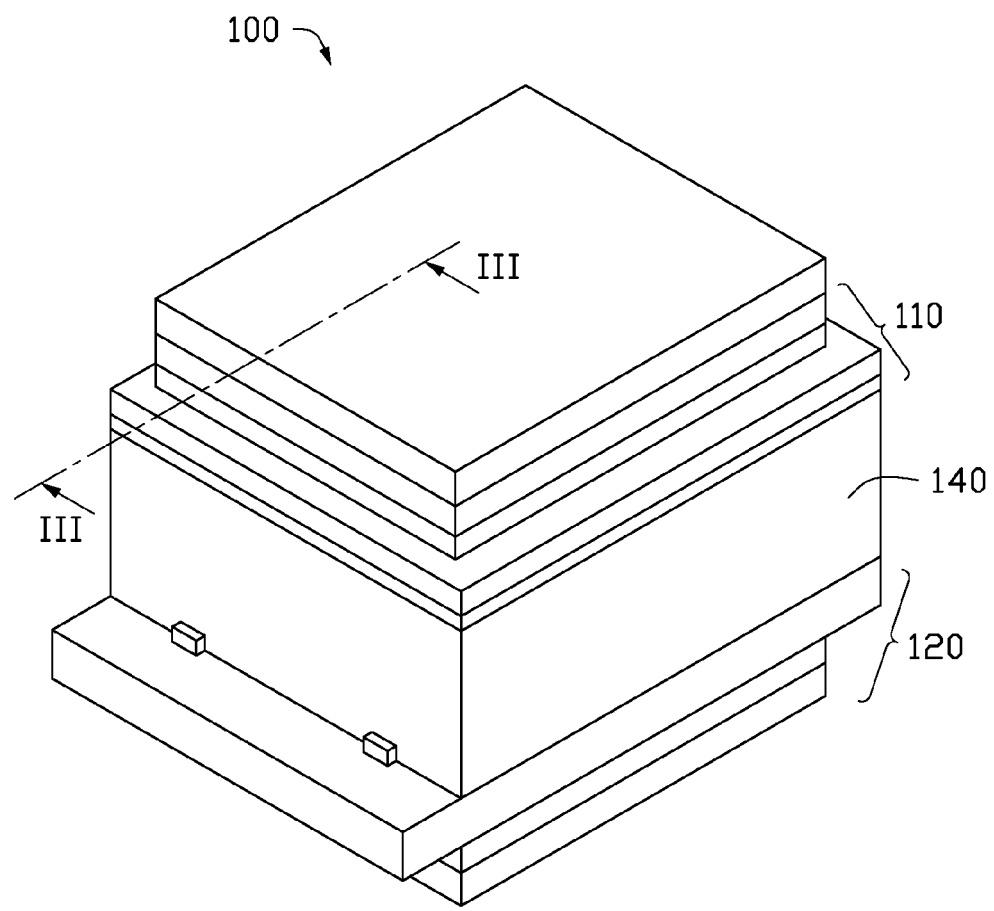
FIG. 1 is an isometric view of an exemplary embodiment of an in-cell touch display apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like. The term "circuit" is defined as an integrated circuit (IC) with a plurality of electronic elements, such as capacitors, resistors, and the like.

The present disclosure provides an in-cell touch display apparatus with a protection layer cooperated with a sealant and the TFT array substrate to form an electrostatic discharge (ESD) path.

Figure 2:
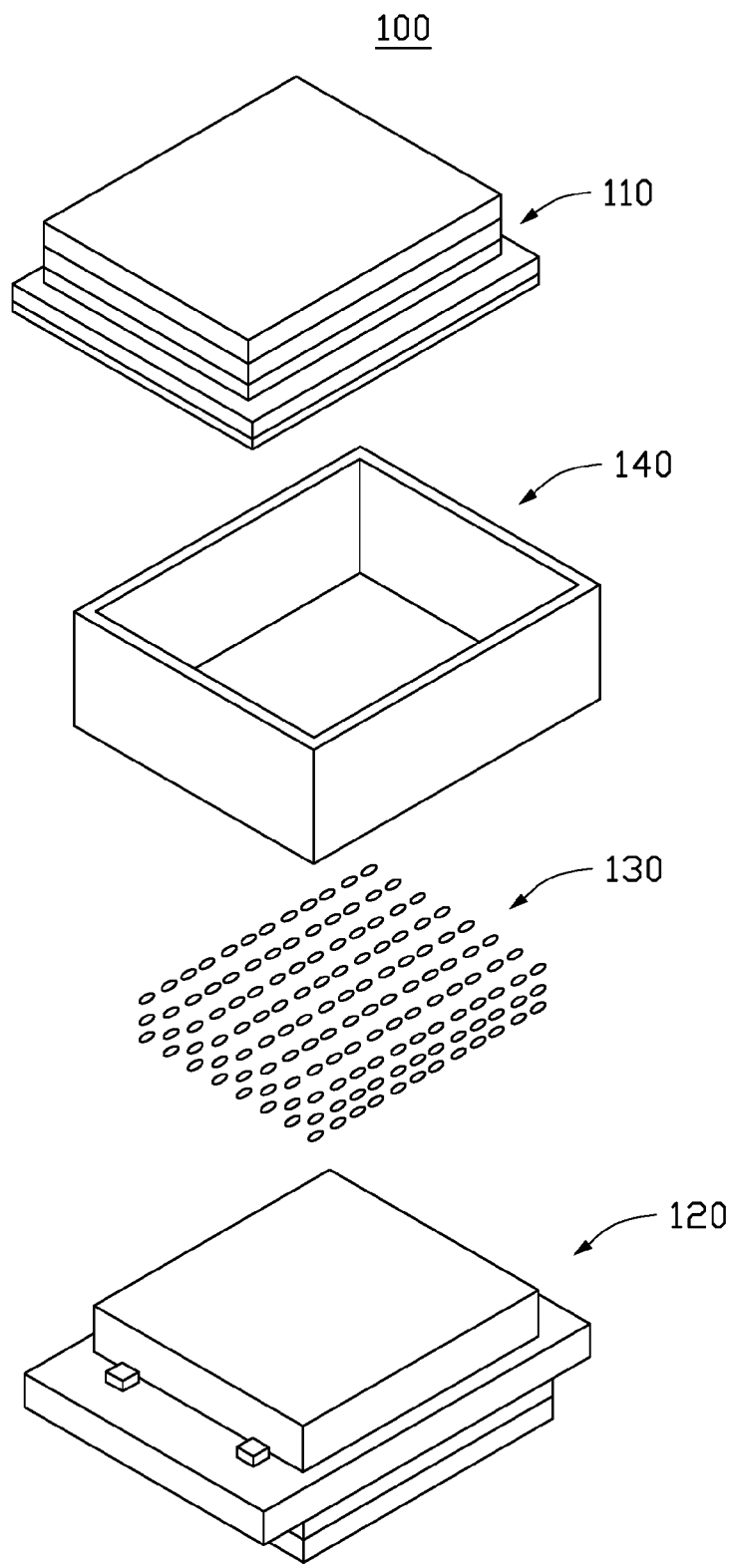
FIG. 2 is a partially exploded view of the in-cell touch display apparatus of FIG. 1.

FIGS. 1-2 illustrate an exemplary embodiment of the in-cell touch display apparatus 100 and an exploded view. The in-cell touch display apparatus 100 includes a color filter structure 110 and a thin film transistor (TFT) array structure 120. As shown in FIG. 2, there is a liquid crystal layer 130 between the color filter structure 110 and the TFT array structure 120, and a sealant 140 surrounding the liquid crystal layer 130. The sealant 140 adhesively holds the color filter structure 110 and the TFT array structure 120 together, and seals the liquid crystal layer 130 between the color filter structure 110 and the TFT array structure 120. In at least one exemplary embodiment, the sealant 140 is a conductive material, such as silver particles, which is also adhesive.

Figure 3:
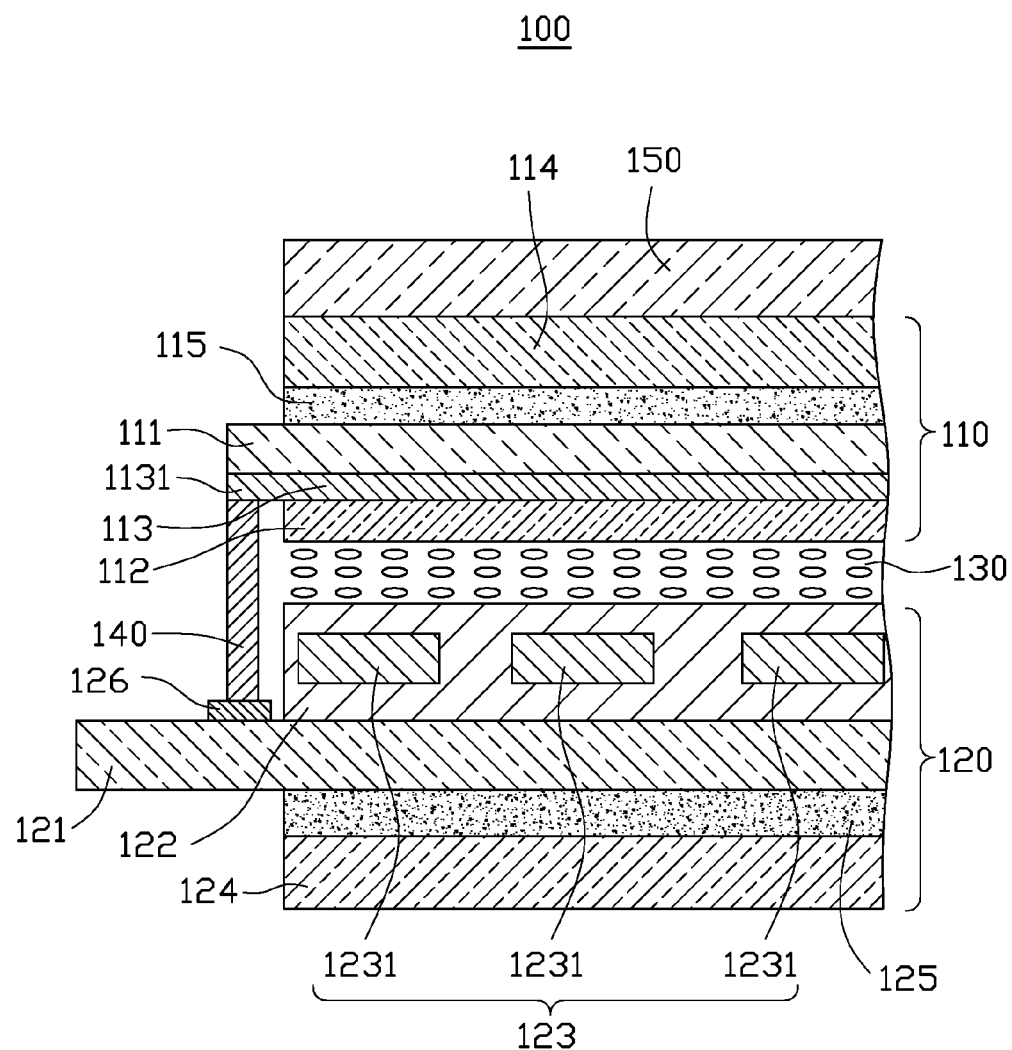
FIG. 3 is a cross-sectional view of a first exemplary embodiment of the in-cell display apparatus of FIG. 1.

FIG. 3 illustrates a cross-section of the in-cell touch display apparatus 100. The color filter structure 110 includes a first substrate 111, a color filter layer 112, an anti-ESD protection layer 113, a first polarizer 114, and a first adhesive layer 115.

The first substrate 111 is made of, for example, transparent glass, quartz, or plastic. Further, in another exemplary embodiment, the first substrate 111 may be, for example, a flexible substrate. Suitable materials for the flexible substrate comprise, for example, polyethersulfone (PES), polyethylenenaphthalate (PEN), polyethylene (PE), polyimide (PI), polyvinyl chloride (PVC), polyethylene terephthalate (PET), or combinations thereof.

The color filter layer 112 is located between the first substrate 111 and the liquid crystal layer 130.

The anti-ESD protection layer 113 is located between the first substrate 111 and the color filter layer 112. The anti-ESD protection layer 113 overlaps and is in direct contact with the first substrate 111. The anti-ESD protection layer 113 discharges electrostatic charges in the in-cell touch display apparatus 100 to a grounded region 126. Electrostatic charges may exist in the first adhesive layer 115. In at least one exemplary embodiment, the anti-ESD protection layer 113 can be made of conductive material, such as electronic conductive polymer or metal oxide. In the embodiment, a surface resistance of the anti-ESD protection layer 113 is greater than the surface resistance of the first adhesive layer 115, and preferably, the material of the anti-ESD protection layer 113 may be selected from the material having the surface resistance from about $10^8$ ohms/$cm^2$ to $10^{11}$ ohms/$cm^2$. Thereby, the electrostatic charges in the first adhesive layer 115 are more effectively discharged due to the above mentioned characteristics about the surface resistance of the anti-ESD protection layer 113. Furthermore, a penetration of the anti-ESD protection layer 113 is not less than 99% so as to minimize the impact on the penetration ratio of the in-cell touch display apparatus 100.

A size of the anti-ESD protection layer 113 along a second direction parallel with the first substrate 111 is larger than a size of the color filter layer 112, thus the color filter layer 112 is completely covered by the anti-ESD protection layer 113. The anti-ESD protection layer 113 includes an extending portion 1131 extending beyond an edge of the color filter layer 112. The extending portion 1131 faces the sealant 140, and is in contact with the sealant 140 so as to discharge the electrostatic charges to ground through the sealant 140.

The first polarizer 114 is located on a surface of the first substrate 111 facing away from the liquid crystal layer 130. The first adhesive layer 115 adhesively holds the first polarizer 114 and the first substrate 111 together. The first adhesive layer 115 contains no conductive particles. In at least one exemplary embodiment, the first adhesive layer 115 is a pressure sensitive (PAS) and electrically insulating adhesive.

The TFT array structure 120 includes a second substrate 121, a TFT array layer 122, a touch electrode layer 123, a second polarizer 124, a second adhesive layer 125, and the ground region 126.

The second substrate 121 is made of, for example, transparent glass, quartz, or plastic. Further, in another exemplary embodiment, the second substrate 121 may be, for example, a flexible substrate. Suitable materials for the flexible substrate comprise, for example, polyethersulfone (PES), polyethylenenaphthalate (PEN), polyethylene (PE), polyimide (PI), polyvinyl chloride (PVC), polyethylene terephthalate (PET), or combinations thereof. A size of the second substrate 121 is larger than a size of the first substrate 111.

The TFT array layer 122 and the touch electrode layer 123 are located on a surface of the second substrate 121 adjacent to the liquid crystal layer 130. The touch electrode layer 123 is located in the TFT array layer 122, or on the TFT array layer 122, or located below the TFT array layer 122. In this embodiment, the touch electrode layer 123 is insulated from the TFT array layer 122 by an insulation layer (not shown).

The touch electrode layer 123 senses a touch operation applied on the in-cell touch display apparatus 100. In detail, the touch electrode layer 123 can for example sense the touch operation by detecting capacitance of a formed capacitive type touch structure. In at least one exemplary embodiment, the touch electrode layer 123 is a self-capacitive type touch structure. The touch electrode layer 123 is patterned to form a plurality of touch electrodes (not shown) in a matrix for sensing the touch operation applied on the in-cell touch display apparatus 100. In other exemplary embodiments, the touch electrode layer 123 is a mutually-capacitive type touch structure. The touch electrode layer 123 is patterned to form a plurality of first electrodes (not shown) and a plurality of second electrodes (not shown). The first electrodes receives touch driving signals, and the first electrode and second electrodes cooperate with each other to form capacitor for determining the touch position by detecting changes of the capacitance.

In at least one exemplary embodiment, the touch electrode layer 123 can serve as a common electrode layer in a time period for display, and serve as a touch electrode layer in another time period for touch.

The second polarizer 124 is located on a surface of the second substrate 121 facing away the liquid crystal layer 130.

The second adhesive layer 125 pastes the second polarizer 124 and the second substrate 121 together. In at least one exemplary embodiment, the second adhesive layer 125 contains no conductive particles. The second adhesive layer 125 can be for example a pressure sensitive (PAS) and electrically insulating adhesive adhesive.

The ground region 126 is located on a peripheral region of the second substrate 121, and faces the sealant 140. The ground region 126 directly contacts sealant 140. The anti-ESD protection 113, the sealant 140, and the ground region 126 form an ESD path for discharging the electrostatic charges in the in-cell touch display apparatus 100. In at least one exemplary embodiment, the ground region 126 is a ground element located on the second substrate 121. In other embodiments, the ground region 126 can be a ground line or ground terminal located on the second substrate 121, or a ground line or ground terminal that is connected to a ground pin of a circuit board.

In other exemplary embodiments, the in-cell touch display apparatus 100 can further include a cover glass 150 located on the color filter structure 110. The cover glass 150 protects the in-cell touch display apparatus 100. The cover glass 150 is pasted on an outer surface of the in-cell touch display apparatus 100. In at least one exemplary embodiment, the cover glass 150 is located on a surface of the color filter 110 facing away from the liquid crystal layer 130. Touches applied on the cover glass 150 and the touch electrode layer 123 are detected by a voltage difference. The anti-ESD protection layer 113 discharges the electrostatic charges for preventing an inaccuracy and enhancing a sensitivity of the touch electrode layer 123. The in-cell touch display apparatus 100 can further include a pixel electrode layer (not shown) electrically connected with the TFT array layer 122 and a common electrode layer (not shown). These layers cooperate with each other to form an electric field to rotate the liquid crystal layer 130 for displaying images. The pixel electrode layer (not shown) receives a grayscale voltage from the TFT array layer 122. The in-cell touch display apparatus 100 can further include a backlight module (not shown) located on a surface of the TFT array structure 120 away from the liquid crystal layer 130. The backlight module provides backlight to the in-cell touch display apparatus 100, and cooperates with the in-cell touch display apparatus 100 to form an in-cell touch liquid crystal display module suitable for use in a mobile phone and tablet.

Based on the structure, the anti-ESD protection layer discharges the electrostatic charges in the in-cell touch display apparatus to the ground region. Therefore, a touch-sensing function of the in-cell touch display apparatus is improved.

The touch electrode layer 123 located on the TFT array structure 120 and the anti-ESD protection layer 113 located on the color filter structure 110 discharge the electrostatic charges. The penetration of the anti-ESD protection layer 113 is more than or equal to 99% so as to not affect the penetration of the in-cell touch display apparatus 100.

Further, the anti-ESD protection layer 113 is located between the first substrate 111 and the second substrate 121. This is effectively an inner element in a cell, and is between the first adhesive layer 115 and the second adhesive layer 125, the anti-ESD protection 113 can discharge electrostatic from an interior of the cell, from the first adhesive layer 115, and from the second adhesive layer 125. Such protection is an improvement compared with the anti-ESD protection layer 113 located on a side of the first substrate 111 or on a side of the second substrate 121.

Figure 4:
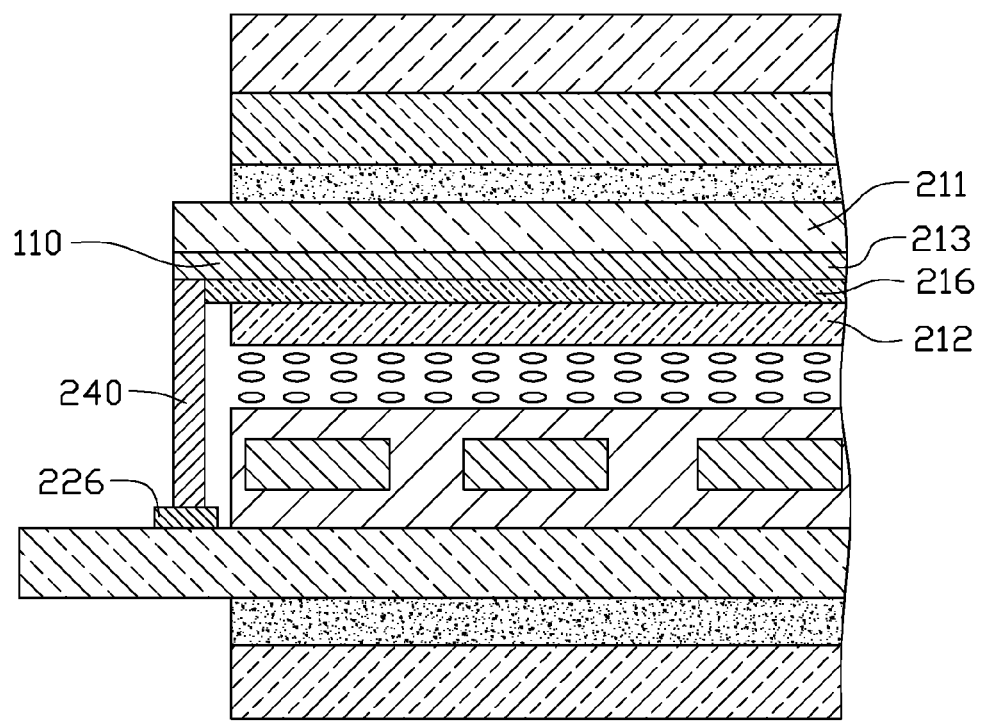
FIG. 4 is a cross-sectional view of a second exemplary embodiment of the in-cell display apparatus of FIG. 1.

FIG. 4 illustrates a cross-section of a second embodiment of the in-cell touch display apparatus 200. The in-cell touch display apparatus 200 is similar to the in-cell touch display apparatus 100. The elements in the in-cell touch display apparatus 200 with the same name have the same function as the elements in the in-cell touch display apparatus 100. That is, the description of the elements having the same reference numerals in the first exemplary embodiment is equally applicable to this exemplary embodiment. The difference between the in-cell touch display apparatus 200 and the in-cell touch display apparatus 100 is that the in-cell touch display apparatus 200 further includes a barrier layer 216. The barrier layer 216 is between the anti-ESD protection layer 213 and the color filter 212. The barrier layer 216 enhances an adhesive strength between the anti-ESD protection layer 213 and the color filter 212, and prevents chemical bonding between the anti-ESD protection layer 213 and the color filter 212. A size of the barrier layer 216 is larger than a size of the color filter layer 212 so as to completely overlap the color filter 212 and completely insulate the anti-ESD protection 213 from the color filter 212. A size of the anti-ESD protection 213 is larger than a size of the barrier layer 216 so as to completely overlap the barrier layer 216. The anti-ESD protection layer 216 includes an extended portion 2131 facing the sealant 240. The extended portion 2131 extends out of an edge of the color filter 212 and the barrier layer 216. The extended portion 2131, the sealant 240, and the ground region 226 form an ESD path. Edge surfaces of the color filter layer 212, the barrier layer 216, and the anti-ESD protection layer 213 are not flushed against one another.

Based on the structure, the anti-ESD protection layer discharges the electrostatic charges in the in-cell touch display apparatus to the ground region. Therefore, a touch-sensing function of the in-cell touch display apparatus is improved.

Figure 5:
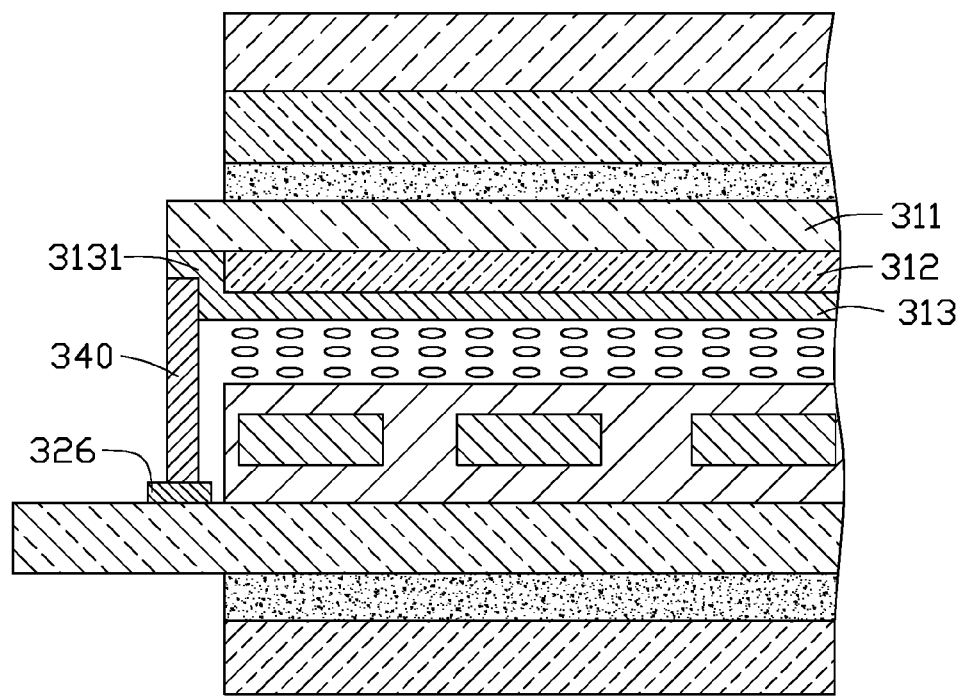
FIG. 5 is a cross-sectional view of a third exemplary embodiment of the in-cell display apparatus of FIG. 1.

FIG. 5 illustrates a cross-section of a third exemplary embodiment of the in-cell touch display apparatus 300. The in-cell touch display apparatus 300 is similar to the in-cell touch display apparatus 100. The elements in the in-cell touch display apparatus 300 with the same name have the same function as the elements in the in-cell touch display apparatus 100. That is, the description of the elements having the same reference numerals in the first exemplary embodiment is equally applicable to this exemplary embodiment. The difference between the in-cell touch display apparatus 300 and the in-cell touch display apparatus 100 is the anti-ESD protection layer 313. The color filter layer 312 is between the first substrate 311 and the anti-ESD protection layer 313. A size of the anti-ESD protection layer 313 is larger than a size of the color filter layer 212. An extending portion 3131 of the anti-ESD protection layer 313 is substantially L-shaped and covers a side surface of the color filter layer 312 and a surface of the first substrate 311. The extending portion 3131 electrically connects the sealant 340 and the ground region 326 to establish an ESD path.

Based on the structure of the anti-ESD protection layer, the anti-ESD protection layer discharges the electrostatic charges in the in-cell touch display apparatus to the ground region.

Figure 6:
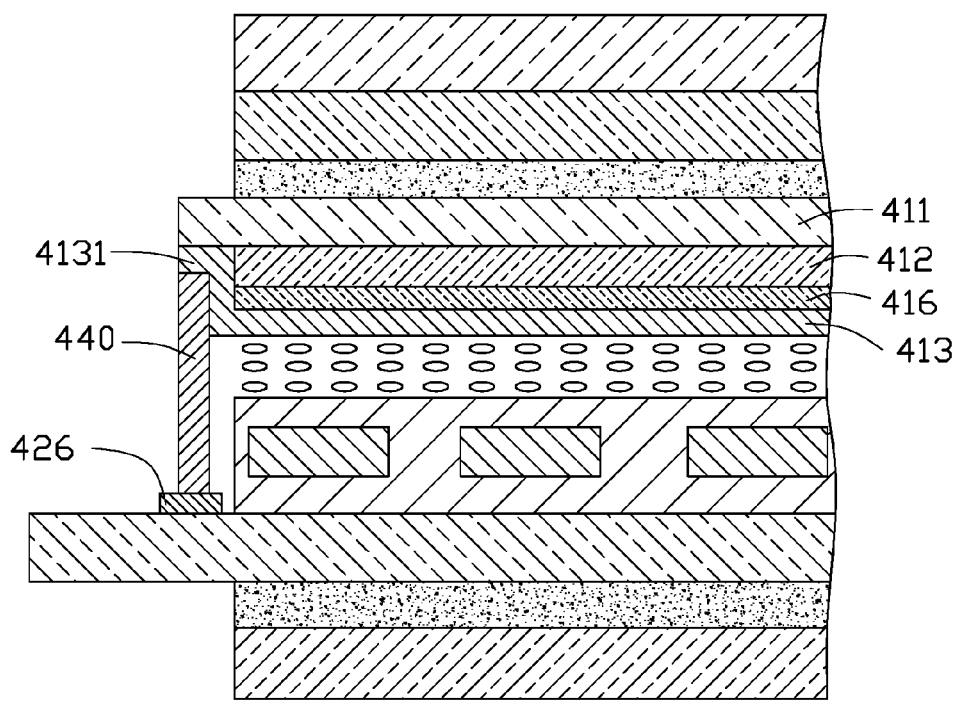
FIG. 6 is a cross-sectional view of a fourth exemplary embodiment of the in-cell display apparatus of FIG. 1.

FIG. 6 illustrates a cross-section of a fourth exemplary embodiment of the in-cell touch display apparatus 400. The in-cell touch display apparatus 400 is similar to the in-cell touch display apparatus 300. The elements in the in-cell touch display apparatus 400 with the same name have the same function as the elements in the in-cell touch display apparatus 300. That is, the description of the elements having the same reference numerals in the third exemplary embodiment is equally applicable to this embodiment. The difference between the in-cell touch display apparatus 400 and the in-cell touch display apparatus 300 is that the in-cell touch display apparatus 400 further includes a barrier layer 416. The barrier layer 416 is between the anti-ESD protection layer 413 and the color filter 412. The barrier layer 416 enhances an adhesive strength between the anti-ESD protection layer 413 and the color filter 412, and prevents chemical bonding between the anti-ESD protection layer 413 and the color filter 412. A size of the barrier layer 416 is equal to a size of the color filter layer 412. The barrier layer 216 completely covers the color filter 412. The extending portion 4131 is substantially L-shaped. The extending portion 4131 covers a side of the barrier layer 416, a side of the color filter 412, and a surface of the first substrate 411.

Based on the structure, the anti-ESD protection layer discharges the electrostatic charges in the in-cell touch display apparatus to the ground region.

While various exemplary and preferred embodiments have been described the disclosure is not limited thereto. On the contrary, various modifications and similar arrangements (as would be apparent to those skilled in the art) are also intended to be covered. Therefore, the scope of the appended claims should be accorded the broadest interpretation so as to encompass all such modifications and similar arrangements.

What is claimed is:

1. An in-cell touch display apparatus comprising:
   a thin film transistor (TFT) array structure with a touch electrode layer and a grounded portion;
   a color filter structure oppositely facing the TFT array structure;
   a liquid crystal layer between the color filter structure and the TFT array structure; and
   a sealant between the color filter structure and the TFT array structure, and surrounding the liquid crystal layer;
   wherein the color filter structure comprises an anti-ESD protection layer; the anti-ESD protection layer directly contacts the sealant; the anti-ESD protection layer, the sealant, and the ground portion form an electro statics discharge (ESD) path to discharge electrostatic charges in the in-cell touch display apparatus; the anti-ESD protection layer discharges the electrostatic charges in the in-cell touch display apparatus to the ground portion; the color filter structure comprises a first substrate and a color filter layer located between the first substrate and the liquid crystal layer; wherein the anti-ESD protection layer is between the first substrate and the color filter layer; the anti-ESD protection layer comprises an extending portion; the extending portion is substantially L-shaped; the extending portion covers a side surface of the color filter, and a surface of the first substrate; wherein the extending portion directly contacts the sealant.

2. The in-cell touch display apparatus of claim 1, wherein the color filter structure further comprises a barrier layer; the barrier layer is between the anti-ESD protection layer and the color filter layer; the barrier layer prevents chemical bonding between the anti-ESD protection layer and the color filter layer.

3. The in-cell touch display apparatus of claim 1, wherein the color filter structure further comprises a first polarizer layer and a first adhesive layer; the first adhesive layer adhesively holds the first polarizer layer on a surface of the first substrate facing away the liquid crystal layer; the first adhesive layer is a pressure sensitive and electrically insulating adhesive.

4. The in-cell touch display apparatus of claim 1, wherein the TFT array structure further comprises a second substrate, a second polarizer layer, and a second adhesive layer; the second adhesive layer adhesively holds the second polarizer layer on a surface of the second substrate facing away from the liquid crystal layer; the second adhesive layer is a pressure sensitive and electrically insulating adhesive.

5. The in-cell touch display apparatus of claim 1, wherein a surface resistance of the protection layer is about $10^8$ ohms/cm$^2$ to $10^{11}$ ohms/cm$^2$.

6. The in-cell touch display apparatus of claim 1, wherein the anti-ESD protection layer is made of conductive materials.

* * * * *